United States Patent [19]

Holien

[11] Patent Number: 4,806,241

[45] Date of Patent: Feb. 21, 1989

[54] OVERFLOW LINT STRAINER

[76] Inventor: Dwight H. Holien, 14351 Peterboro, Sterling Heights, Mich. 48078

[21] Appl. No.: 50,857

[22] Filed: May 18, 1987

[51] Int. Cl.[4] .......................................... B01D 35/02
[52] U.S. Cl. .................................. 210/248; 210/463; 210/497.01; 68/18 F; 4/652
[58] Field of Search ............... 210/167, 171, 248, 460, 210/461, 463, 486, 497.01, 497.2; 68/208, 271, 18 F; 4/652; D23/42

[56] References Cited

U.S. PATENT DOCUMENTS

| 960,901 | 6/1910 | Hall | 4/652 |
|---|---|---|---|
| 1,589,544 | 6/1926 | Natow et al. | 4/652 |
| 1,804,715 | 5/1931 | Tafel, Jr. | 4/652 |
| 2,512,394 | 6/1950 | Sullivan | 210/497.01 |
| 2,548,541 | 4/1951 | MacDonald | 210/497.01 |
| 3,984,330 | 10/1976 | Nichols | 210/460 |
| 4,123,361 | 10/1978 | Marschman | 210/463 |
| 4,443,111 | 4/1984 | Minaire | 68/208 |
| 4,566,970 | 1/1986 | Piai et al. | 210/460 |

Primary Examiner—Richard V. Fisher
Assistant Examiner—Wanda L. Millard
Attorney, Agent, or Firm—Reising, Ethington, Barnard, Perry & Milton

[57] ABSTRACT

A filter assembly (10) for use in laundry tubs or similar fluid receptacles includes a tubular body portion (11) having a plurality of holes (12) arranged in a plurality of bands (14, 16, 18). All of the holes (12) within one of the bands (14, 16, 18) have diameters of equal dimension. The diameters of the holes (12) increase from a relatively smaller dimension in the bands (14) at the ends of the body portion (11) to a relatively larger dimension in the band (18) at the middle of the body portion (11). The body portion (11) is secured to a waste drain (26, 26') by an elastic band (32) having a hook (36) at one end thereof and a rod (34) at the other end. The rod (34) is inserted in grooves (38, 38') in the end of the tube and, the elastic band is stretched through the body portion (11) and the hook is connected to a bar (37) in the drain (26, 26') to secure the body portion (11) to the drain (26, 26').

11 Claims, 2 Drawing Sheets

OVERFLOW LINT STRAINER

TECHNICAL FIELD

The present invention relates to filter assemblies for waste drains.

BACKGROUND ART

Filter assemblies for drains and having overflow capabilities are known in the prior art. For example, U.S. Pat. No. 438,465 issued Oct. 14, 1890 to Blessing discloses an overflow device for use in bathtubs or set basins. The device includes a tubular shaft having a pair of bands of openings having equal dimensions. The openings permit water to flow therethrough but prohibit the flow of solid articles, such as washcloths, therethrough. Should the openings in the base of the assembly become clogged, the water will rise high enough in the basin or tub to reach the overflow openings at the top of the assembly. The water then flows through the overflow openings to permit draining of the sink or tub.

U.S Pat. No. 3,330,417 to Gold et al issued July 11, 1967 discloses another type of overflow drain device. The Gold et al patent provides a tubular member having an opening at the top thereof. The opening permits water to flow therethrough. This opening provides a swirl pattern in the sink to transport floating refuse and prevents stagnation of the water flow. The floating refuse is trapped inside the assembly and not permitted to flow into the drain.

Prior art structures are deficient in that once the holes become plugged, they must be manually cleaned in order to permit water to flow therethrough.

SUMMARY OF THE INVENTION AND ADVANTAGES

According to the present invention, there is provided a filter assembly comprising a tubular body portion having a plurality of openings. The openings have diameters. The openings are arranged in a plurality of adjacent bands. The assembly is characterized by the diameter of each of the openings of one of the bands being different than the diameter of each of the openings of an adjacent one of the bands.

Accordingly, there is provided an assembly which compensates for the clogging of the openings by solids in the fluid.

FIGURES IN THE DRAWINGS

Other advantages of the present invention will be readily appreciated as the same becomes better understood by reference to the following detailed description when considered in connection with the accompanying drawings wherein.

DETAILED DESCRIPTION OF THE DRAWINGS

Figure 1:
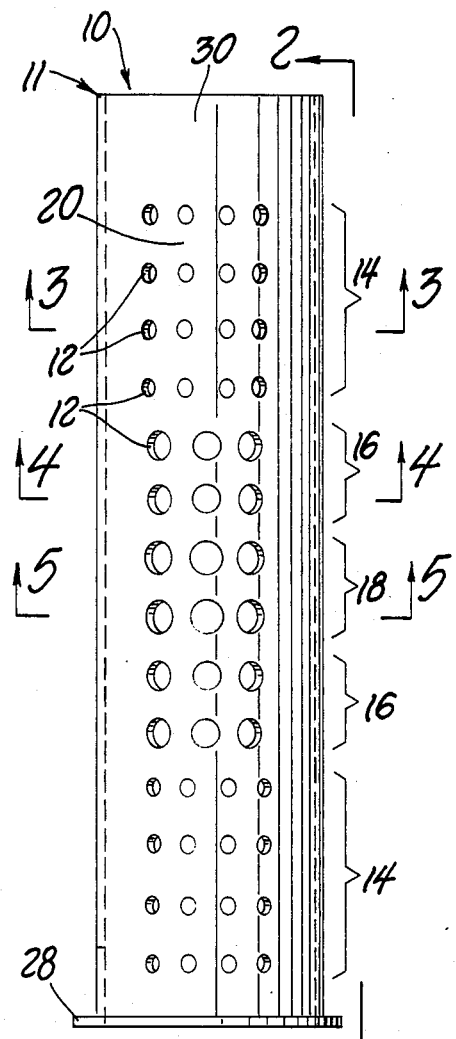
FIG. 1 is a front view of the subject invention.
Figure 2:
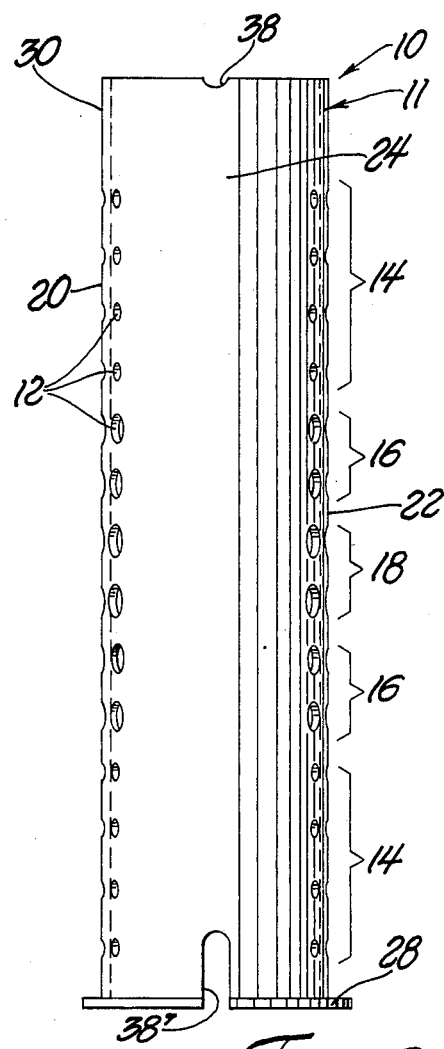
FIG. 2 is a side view taken along lines 2—2 of FIG. 1.
Figure 3:
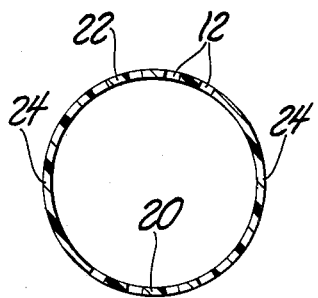
FIG. 3 is a cross-sectional view taken along lines 3—3 of FIG. 1.
Figure 4:
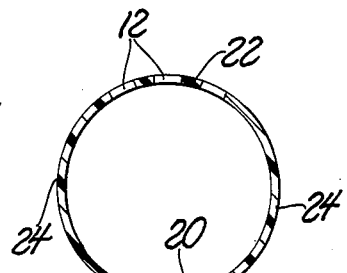
FIG. 4 is a cross-sectional view taken along lines 4—4 of FIG. 1.
Figure 5:
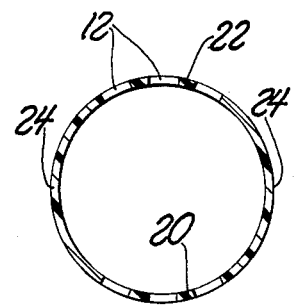
FIG. 5 is a cross-sectional view taken along lines 5—5 of FIG. 1.

A filter assembly constructed in accordance with the present invention is generally shown at 10.

The assembly 10 includes a tubular body portion generally indicated at 11 having a plurality of openings 12 having diameters. The openings 12 are arranged in a plurality of adjacent bands 14, 16 and 18. The assembly is characterized by the diameter of each of the openings 12 of one of the bands 14, 16, 18 being different than each of the openings 12 of an adjacent one of the bands 14, 16, 18.

The diameter of each of the openings 12 within each of the bands 14, 16, 18 is equal. That is, the diameter of the openings 12 within the band 14 are all of equal dimension. Similarly, the diameter of each of the openings 12 within the band 16 are of equal dimension; the diameter of each of the openings 12 within the band 18 are of equal dimension. However, each band may include one or more circumferentially extending rows, e.g., band 16 includes two such rows while bands 14 each include four rows.

The tubular body portion 11 has a first end defined by a flange 28, a second end defined by a straight portion 30 and a middle portion. The diameter of the openings 12 increases from a relatively smaller dimension in the bands 14 adjacent the first and second ends to a relatively larger dimension in the band 18 of the middle portion. The bands 14 have openings 12 with diameters of smaller dimension than the openings 12 of the next adjacent bands 16. Similarly, the diameters of the openings 12 of bands 16 are of smaller dimension then the diameters for the openings 12 of the band 18 at the middle portion of the tubular body portion 11.

The body portion 11 has a plane of symmetry or dividing plane which defines front 20 and rear 22 faces. The openings 12 of the bands 14, 16, 18 are coextensive with only a portion of the front and rear faces 20, 22. Thus, the body portion 11 has a pair of diametrically opposed solid portions 24, i.e., the solid portions 24 are devoid of openings at positions through portions of the circumference 180 degrees apart to separate 180 degrees opposed bands of openings 12.

Figure 6:
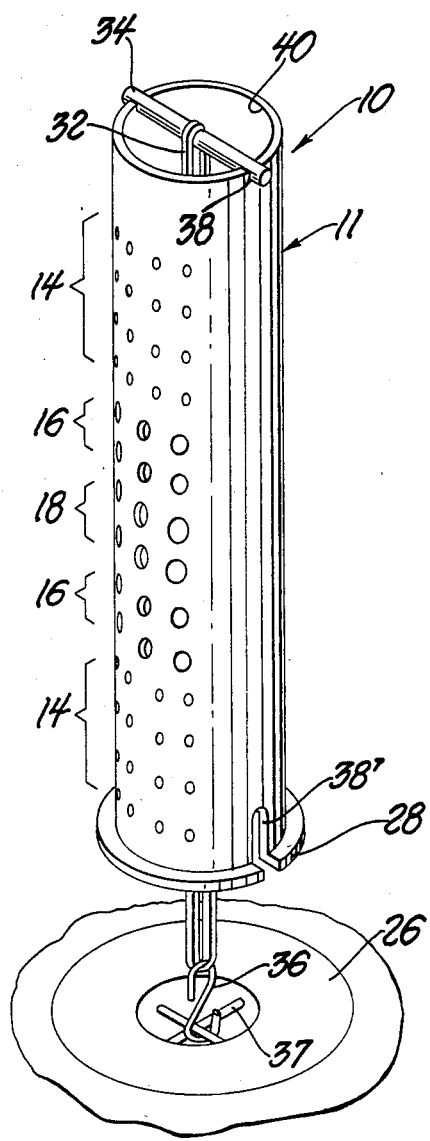
FIG. 6 is an isometric view of the subject invention used in connection with a flat type drain.

The body portion 11 further includes engagement means for engaging a waste drain 26, 26'. The engagement means may comprise a radially extending flange 28 at the first end of the tubular body portion 11. The flange 28 is for engaging a flat type waste drain 26 as shown in FIG. 6. The flange 28 rests on the drain 26 and supports the body portion 11.

Figure 7:
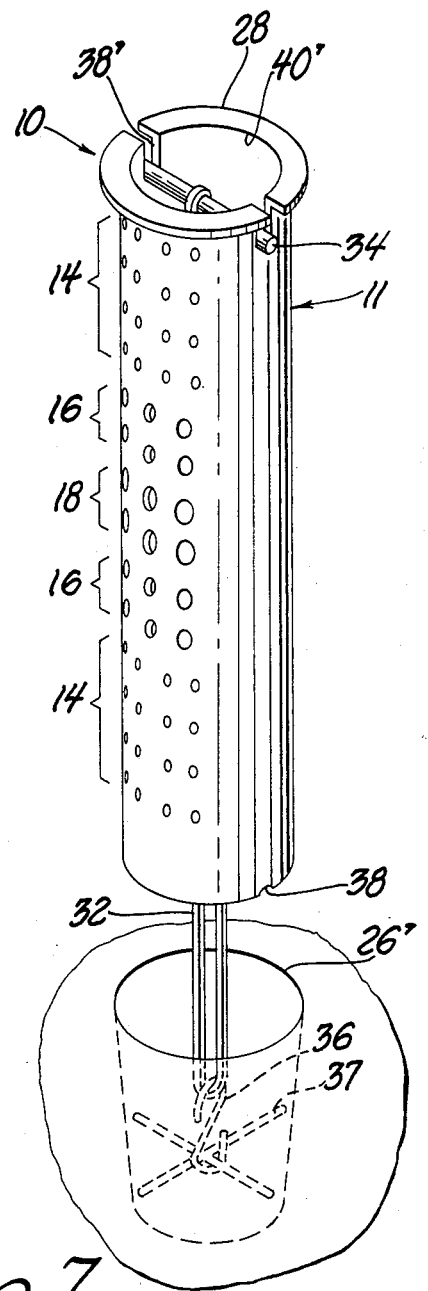
FIG. 7 is an isometric view of the subject invention used in connection with a cup type drain.

The engagement means may also comprise a straight-walled portion 30 at the second end of the tubular body portion 11, i.e., devoid of lateral protrusions. The body portion 11 can be inverted so that the straight end portion 30 can be inserted in a cup type drain 26' as shown in FIG. 7. The straight portion 30 provides stability for the body portion 11.

The assembly 10 further includes hold down means for securing the body portion 11 to the waste drain 26, 26'. The hold down means comprises an elastic band 32, a rod 34, and a hook 36. The rod 34 is disposed at one end of the elastic band 32 and the hook 36 is disposed at the opposite end thereof. The hook 36 is adapted for attachment to a bar 37 fixed within the drain 26, 26' to secure the body portion 11 to the drain 26, 26'.

The assembly further includes retaining means which comprise a plurality of grooves 38, 38' at the first end and the second end of the body portion 11. In the case of flat type drain 26 (FIG. 6) the rod 34 is inserted in the grooves 38 at the second end of the body portion 11. When the assembly is to be used with a cup type drain 26' (FIG. 7), the tubular body portion 11 is inverted and the rod 34 is inserted in the grooves 38' at the first end of the body portion 11.

The tubular body portion 11 further includes an overflow opening 40, 40' at the second and first end thereof respectively. In the event that all of the openings 12 in all of the bands 14, 16, 18 become clogged, the water level in the sink, wash basin, tub, or similar water receptacle will rise to a level equal to that of the height of the body portion 11. The water will then flow into the overflow opening 40, 40' to permit the water to drain out of the water receptacle.

In operation, a filter assembly 10 may be used in connection with a flat type drain 26 (FIG. 6) of a water receptacle such as a laundry tub. The rod 34 is placed in the grooves 38 of the second end of the body portion 11. The elastic band 32 is stretched through the body portion 11 and the hook 36 at the opposite end thereof is connected with the bar 37 in the waste drain 26. The elasticity of the band 32 then pulls the body portion 11, and the flange 28 into engagement with the waste drain 26 to secure the body portion 11 with drain 26.

Water is then introduced to the tub. The water will flow through the holes 12 of the band 14 at the first end of the body portion. If the holes 12 of the band 14 become clogged, such as by lint or articles of clothing, the water level in the tub will rise to the level of the holes 12 of the band 16 and the water in the tub flows therethrough. Since the holes of the band 16 are larger than the holes 12 of the band 14, a larger amount of water is permitted to flow therethrough. As more water flows through the holes 12 of the band 16, a vacuum is created within the body portion 11. The vacuum draws the solids which clog the holes 12 of the band 14 downwardly toward the base (first end) of the body portion 11. Similarly, if the holes 12 of the band 16 become clogged such as by lint, the water level in the tub is allowed to rise to the level of the holes 12 of the band 18. The holes 12 of the band 18 are of larger dimension then the holes 12 of the band 16. Thus, more water is allowed to flow through the holes 12 of the band 18 to create a vacuum in the body portion 11. As described previously, this influx of water creates a vacuum and draws the solids clogging the holes 12 of the bands 14, 16 downwardly toward the first end of the body portion 11. The holes 12 of the bands 14, 16 are thus cleared by the vacuum and water is again permitted to flow therethrough. If all of the holes 12 in all of the bands 14, 16, 18 become clogged, the water will rise to the height of the body portion 11. The water will then flow into the overflow opening 40 to create the vacuum in the body portion 11 to clear the holes 12 of the band 14, 16, 18. This arrangement of the holes 12 from a relatively smaller dimension in the band 14 to the holes having a relatively larger dimension and the band 18 permits this vacuum to be formed when the holes 12 in the band 16, 18 become clogged and permits the holes 12 to clear themselves without the need for manual cleaning.

Similarly, the assembly 10 may be used in connection with a cup type drain 26 as shown in FIG. 7. When used with such a drain, the body portion 11 is inverted. The rod 34 is inserted into the grooves 38' at the first end of the body portion 11. The elastic band 32 is then stretched so that the hook 36 can be secured to the bar 37 of the cup type drain 26'. The elasticity of the band 32 then draws the solid portion 30 of the tubular body portion 11 into engagement with the cup type drain 26'. The band which is connected to the rod 34 and to the hook 36 hold the body portion 11 in engagement with the drain 26'. The operation of this arrangement is as previously set forth.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A filter assembly (10) comprising: a tubular body portion (11) having a plurality of openings (12) having diameters, first and second ends and a middle portion, and a plane of symmetry defining front (20) and rear (22) faces, said openings (12) being arranged in a plurality of adjacent bands (14, 16, 18), said bands being coextensive with only a portion of said front (20) and rear (22) faces, said diameter of each of said openings (12) within each of said bands (14, 16, 18) being equal, said diameters of said openings (12) increasing from a relatively smaller dimension in said bands (14) adjacent said first and second ends to a relatively larger dimension in said bands (18) of said middle portion; an overflow opening (40, 40'); engagement means for engaging a waste drain (26, 26'); hold down means for securing said body portion (11) to the waste drain (26, 26'); and retaining means comprising a plurality of grooves (38, 38') at said first end and said second ends of said body portion (11) for retaining said hold down means therein.

2. An assembly as set forth in claim 1 further characterized by said, engagement means comprising a straight portion (30) at said second end of said body portion (11).

3. An assembly as set forth in claim 2 further characterized by said retaining means comprising a plurality of grooves (38, 38') at said first end and said second end of said body portion (11), said hold down means being inserted in said grooves.

4. An assembly as set forth in claim 3 further characterized by said hold down means comprising an elastic band (32), a rod (34) at one end thereof, and a hook (36) at the opposite end thereof.

5. An assembly as set forth in claim 4 further characterized by said hook (36) being adapted for attachment with the waste drain (26, 26') to secure said body portion (11) to the waste drain (26, 26').

6. An assembly as set forth in claim 1 further characterized by said hold down means comprising an elastic band (32), a rod (34) at one end thereof, and a hook (36) at the opposite end thereof.

7. An assembly as set forth in claim 6 further characterized by said hook (36) being adapted for attachment with the waste drain (26, 26') to secure said body portion (11) to the waste drain (26, 26').

8. An assembly as set forth in claim 1 further characterized by said engagement means comprising a radially extending flange (28) at said first end of said body portion (11).

9. A filter assembly (10) comprising: a tubular body portion (11) adapted for disposition in the bottom of a water receptacle, said body portion (11) having first and second ends and a middle portion, a plane of symmetry defining front (20) and rear (22) faces, a plurality of openings (12) having diameters and arranged in a plurality of adjacent bands (14, 16, 18), said openings (12) of said bands (14, 16, 18) being coextensive only with the front (20) and rar (22) faces, the diameter of each of said openings (12) within each of said bands (14, 16, 18) being equal and increasing from a relatively smaller dimension in said bands (14) adjacent said first and second ends to a relatively larger dimension in said bands (18) of said middle portion; an overflow opening (40, 40') for providing water flow therethrough; engagement means for engaging a waste drain (26, 26'); a plurality of grooves (28, 28') at said first and seconds ends of said body portion (11); a rod (34) for disposition in said grooves (38, 38'); an elastic band (32) for depending from said rod (34); and a hook (36) for attachment to said elastic band (32) at the opposite end from said rod (34), said hook being adapted for attachment with the waste drain (26, 26') to secure said body portion (11) thereto.

10. An assembly as set forth in claim 9 further characterized by said engagement means comprising a radially extending flange (28) at said first end of said body portion (11).

11. An assembly as set forth in claim 9 further characterized by said engagement means comprising a straight portion (30) at said second end of said body portion (11).

* * * * *